United States Patent [19]

Shakkottai et al.

[11] Patent Number: 4,762,425
[45] Date of Patent: Aug. 9, 1988

[54] SYSTEM FOR TEMPERATURE PROFILE MEASUREMENT IN LARGE FURNACES AND KILNS AND METHOD THEREFOR

[76] Inventors: Parthasarathy Shakkottai, 2622 Gardi St., Duarte, Calif. 91010; Shakkottai P. Venkateshan, No. 34, III Main Rd., Gandhi Nagar, Adyar, Madras 60020, India

[21] Appl. No.: 108,813

[22] Filed: Oct. 15, 1987

[51] Int. Cl.$^4$ ............................................ G01K 11/22
[52] U.S. Cl. .................................. 374/117; 324/58 R; 367/902
[58] Field of Search ................... 374/117, 119, 137; 324/58 R

[56] References Cited

U.S. PATENT DOCUMENTS

| | | | |
|---|---|---|---|
| 3,103,817 | 9/1963 | Norman | 374/166 |
| 3,137,169 | 6/1964 | Clement et al. | 374/119 |
| 3,427,881 | 2/1969 | Steinberg | 73/339 |
| 3,451,269 | 6/1969 | Johnson | 73/346 |
| 3,470,743 | 10/1969 | Steinberg | 73/340 |
| 3,527,097 | 9/1970 | Jenoe | 374/125 |
| 3,556,496 | 1/1971 | Ernest | 432/32 |
| 3,610,592 | 10/1971 | Thomas | 432/32 |
| 3,834,233 | 9/1974 | Willis et al. | 367/902 X |
| 3,885,436 | 5/1975 | Meyer | 73/339 A |
| 3,921,452 | 11/1975 | Guy | 374/179 |
| 3,946,610 | 3/1976 | Guy | 374/208 |
| 4,118,986 | 10/1978 | Hans | 374/153 |
| 4,176,554 | 12/1979 | Casimir | 374/137 |
| 4,242,907 | 1/1981 | Casimir | 374/113 |
| 4,246,784 | 1/1981 | Bowen | 374/137 X |
| 4,412,090 | 10/1983 | Susumu | 136/230 |
| 4,435,092 | 3/1984 | Tohru | 374/129 |
| 4,440,510 | 4/1984 | Alexander | 374/169 |
| 4,483,630 | 11/1984 | Varela | 374/117 X |
| 4,617,638 | 10/1986 | Vincent | 364/557 |

FOREIGN PATENT DOCUMENTS 52-044681 4/1977 Japan ........................ 374/119

OTHER PUBLICATIONS

"New Sensors for Ultrasound: Measuring Temperature Profiles", Lynnworth and Patch, Materials Research and Standards, vol. 10, No. 8, Aug. 1970, pp. 6–11.

S. F. Green, Acoustic Temperature & Velocity Measurement in Combustion Gases, Paper MT-16 from 8th International Heat Transfer Conf. S. F., CA; vol. 2; Aug. 17–22, pp. 555–560.

A. L. Hedrich & D. R. Pardue, Sound Velocity as a Measurement of Gas Temperature, from Temperature: its Measurement & Control in Science and Industry, vol. 2, ed. by Wolfe (AIP), Reinhold Pub. Corp., N.Y., 1955, pp. 383–392.

Gopalsami & Raptis, Acoustic Velocity & Attenuation Measurements in Thin Rods with Application to Temperature Profiling in Coal Gasification Systems, IEEE Transactions on Sonics & Ultrasonics, vol. SU-31, No. 1, Jan. 1984, pp. 32–39.

Plumb & Cataland, Acoustical Thermometer and the NBS Provisional Temperature Scale 2-20, (1965), Metrologia, International Journal of Scientific Metrology, vol. 2, No. 4, Oct. 1966, pp. 127–139.

N. O'Fallon, "Acoustic Time Domain Reflectometry" from Instrumentation and Monitoring in Science & Technology of Coal and Coal Utilization, Plenum Press, ed. Cooper & Ellington, pp. 633–634.

Rayleigh, Theory of Sound, Dover 187d, p. 30 on Mayer's Suggestion in Phil Mag XLV, p. 18, 1878.

Wadley et al., "Ultrasonic Measurement of Internal Temperature Distribution," R. Soc. of London A, 341-361 (1986).

Primary Examiner—Daniel M. Yasich

[57] ABSTRACT

Measurements of the times of flight of sound waves can be used to determine temperature in a gas contained in a long tube which confines sound waves. Sound pulses are transmitted and received by a suitable loud speaker attached to one end of the long tube. A number of stubs or other discontinuities produce the sound reflections whose times of arrival are measured. The time intervals yield average sound speeds in each interval between any two stubs from which temperatures are calculated. Corrections for thermal expansion of the tube are easily made.

11 Claims, 18 Drawing Sheets

SOUND SPEED = 346.7 m/sec

DERIVED ROOM TEMPERATURE
= 25.5°C (77.9°F)

ROOM TEMPERATURE = 78°F

SYSTEM FOR TEMPERATURE PROFILE MEASUREMENT IN LARGE FURNANCES AND KILNS AND METHOD THEREFOR

BACKGROUND OF THE INVENTION

1. Field of the Invention

The present invention is directed to a system and method of deriving temperature distributions in large combustion chambers such as kilns and boilers. A stepwise temperature distribution is measured by a single ended acoustic device along any desired line of measurement.

2. Description of the Prior Art

Temperature measurements are necessary for the control of industrial processes. Temperature profiles or distributions are considered to be very useful for improvements in control and in energy savings and in cases such as a recovery boiler, also useful in minimizing dust formation. Commonly thermocouples and radiation pyrometers are used for temperature measurements.

There are limitations and disadvantages associated with present techniques in the hostile environments of kilns and furnaces. Commonly employed thermocouples do not survive well in a hostile chemical environment and it is difficult to protect long lead wires with proper insulation capable of withstanding high temperatures. Radiation pyrometers have the disadvantage that they are incapable of providing information on temperature variations within their field of view. The presence of dust, excessive flame brightness, absence of a target in the region of interest add to further uncertainties.

The acoustic method is based on the fact that the speed of sound in a gas is a unique function of temperature. Even though the relation between the speed of sound and temperature has been known for a long time, and has been suggested as a means of temperature measurement (Mayer 1873) it is only recently that the method has seen some development (Hedrich & Pardue 1955; Plumb & Cataland 1966; Lynnworth & Patch 1970; Gopalsami & Raptis 1984; Wadley et al 1986; Green 1986; O'Fallon 1984). Whereas most investigations (Lynnworth & Patch 1970; Gopalsami & Raptis 1984; Wadley et al 1986) dwell on the method as applied to the measurement of temperature field in a flowing gas medium using acoustic tomography. O'Fallon (1984) gives a review of the state of the art as applicable to the measurement of temperature in coal gasification systems.

OBJECTS AND SUMMARY OF THE INVENTION

It is a primary object of the present invention to provide a system for obtaining temperature distributions in large combustion chambers.

The present invention is named the Acoustic Temperature Profile Measuring System (ATPMS). The object of the present invention is described by the text and figures which follow.

A novel feature of the present method consists in confining relatively low frequency sound waves (in the audio range) to propagate through a chosen gas contained in a tubular sensor. Because of the low frequencies involved there are no dispersion effects characteristic of high frequency sound wave (ultrasound) propagation in gases. In addition, because the range of frequencies used in the sound pulses is such that the wavelengths exceed the diameter of the pipe, only the plane wave mode of propagation occurs. This eliminates dispersion effects associated with the propagation of higher modes because these modes do not propagate but are cut off. Experimental data show that the sound pulses preserve their shape upon reflection from discontinuities in the pipe.

The times of flight (TOF) are relatively long and are in the millisecond range since the speeds of sound in gases are much smaller than those in liquids and solids. The method is very sensitive since the TOF variations are up to a 100% larger than a base value at room temperature as opposed to a mere 10-20% larger in the case of metallic solids (Lynnworth & Patch 1970; Gopalsami & Raptis 1984; Wadley et al 1986). Also the speed of sound-temperature relationship is well known and well documented for a large temperature range in the case of gases.

The speed of sound can be accurately measured by the measurement of a distance and the corresponding time of flight (TOF). A schematic of the ATPMS present inside a large furnace 18 is shown in FIG. 1. The system consists of a sensor tube 1 of desired length immersed in the gaseous environment whose temperature profile is desired. In the single ended TOF system shown, a transmitter 2 (a speaker) which doubles as a received (TR/RE) is fitted to one end of the sensor tube. The other end of the sensor tube is closed. The sensor tube contains a gas of known composition. The sensor is arranged to have a required number of reflectors 3 ($R_1$, $R_2$ ... etc.) which may take the form of diametrically placed rods or may be obstructions of any other type. The TR/RE is driven by a pulse generator 4 through an amplifier 5. The TR/RE is also connected to either an oscilloscope 6 or a digital waveform analyzer 7 for time measurement. The signals can be recorded by the camera 8 or plotter 9.

The TR/RE circuitry is shown in more detail in FIG. 2. The blocking diode 10 isolates the amplifier 5 from the return signal (reflected from $R_1$, $R_2$, ... etc. (FIG. 1)). A train of pulses from the signal generator results in a train of sound pulses confined to move down the sensor tube. At each one of the constrictions a part of the sound pulse is returned to the TR/RE 2. These return pulses produce an electrical signal across the TR/RE 2 which is displaced temporally from the main pulse by an amount equal to the time it takes sound to travel twice the distance between the TR/RE 2 and the appropriate reflector. The ratio of this distance to the time of flight gives the average speed of sound over the path.

An x-t diagram (space-time diagram) appropriate to the situation is shown in FIG. 3. The sensor tube 1 is divided, as shown, into segments $l_1$, $l_2$, ... etc. by the reflectors 3 positioned along the tube. Assuming that the speed of sound varies because of the temperature variation along x, the signals are received (with t-0 corresponding to the transmitted pulse (or main pulse MP) at $t_1$, $t_2$, ... etc. It is easy to see from the x-t plot that the speed of sound $c_n$ in the segment $l_n$ is given by the formula $$c_n = 2l_n/(t_n - t_{n-1}). \quad (1)$$

The corresponding temperature $T_n$ is deduced from the formula $$T_n = c_n^2/(\gamma R) °K. \quad (2)$$

where $\gamma$ is the ratio of specific heats and R is the gas constant for the gas contained in the sensor tube. In each case of air the speed of sound at 0° C. (273° K.) is 331.3 m/sec and hence the temperature can be deduced from the formula $$T_n = 273(c_n/331.3)^2 \text{°K.} \qquad (3)$$

BRIEF DESCRIPTION OF THE DRAWINGS

A more complete appreciation of the invention and the attendant advantages thereof will be more clearly understood by reference to the following drawings wherein.

DESCRIPTION OF THE PREFERRED EMBODIMENTS

We describe an acoustic temperature profile measuring system (ATPMS) which is useful for determing temperature profiles over a wide temperature range and over long path lengths. The system will be seen to be simple, accurate, rugged and insensitive to orientation. The laboratory experiments are described below to describe these characteristics.

Although particular embodiments of the invention are described and illustrated below, it is recognized that modifications and variations may readily occur to those skilled in the art and consequently, it is intended that the claims be interpreted to cover such modifications and equivalents.

EXPERIMENTS

Before describing the ATPMS in its final form, we present below the way the final version evolved during our investigation. As is clear from the previous section, many things were taken for granted in arriving at the formulas (1 through 3). The basis for some of these assumptions (specifically involving equilibration, heat transfer, etc.) are given in the description of the results later on. Purely electronic and measurements aspects are discussed first.

Characteristics of the Transmitted Pulse Train

In our experiments we tried three different kinds of speakers for production and detection of sound pulses. These were (1) 2×6 in. solid state piezo
 Wide dispersion horn
 30 W continuous power
 75 W music program power
 Less than 1% total harmonic distortion.
 2000 to 40,000 Hz (2) Realistic 3½in. solid state piezo Super horn
 Less than 1.5% harmonic distortion.
 All other as in (1)

Figure 4:
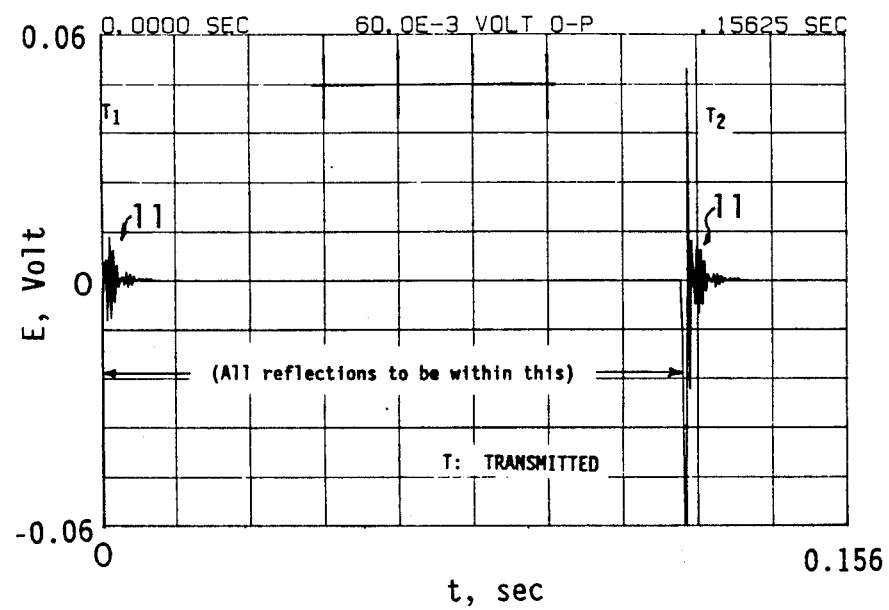
FIG. 4 is a record of a typical transmitted pulse repeated at 0.122s intervals in this case.
Figure 5:
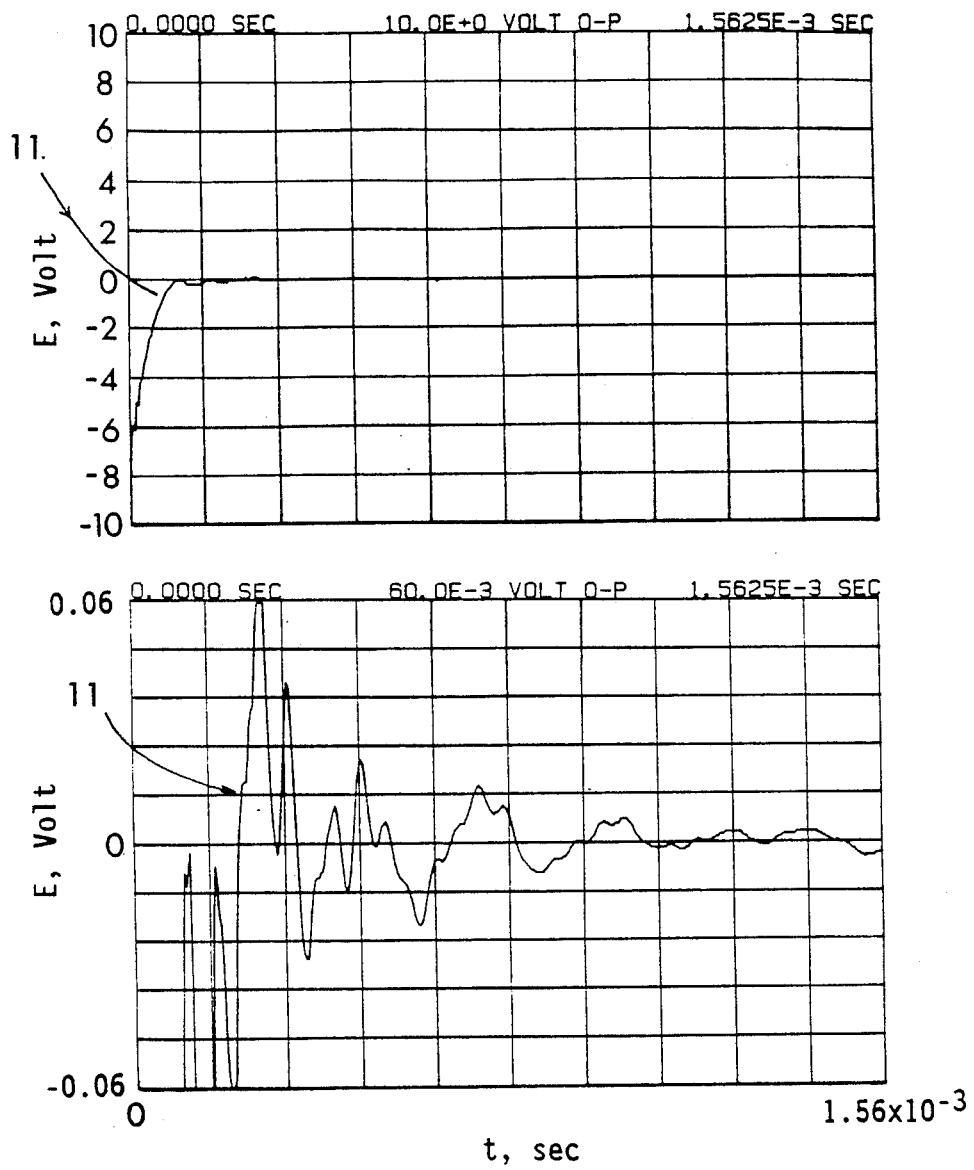
FIG. 5 shows two records of the transmitted waveform to exhibit the extent of the pulse, the lower one being enlarged vertically.

(3) 0.75 in. Hard dome tweeter
 Maximum dispersion
 Power handling 40 W
 Free air resonance 2900 Hz
 Effective frequency range 3000 to 30,000 Hz
 Impedence 8Ω, capacitor 3.3 $\mu$F In the final version of the ATPMS we used the 2×6 in. wide dispersion horn because of its high sensitivity. In all the cases, however, the transmitted pulse train 11 was as shown in FIG. 4. The largest period between pulses of 0.123 sec was due to a limitation of the signal generator that was available. It is clear that all the reflections must be received wihin this period and hence the round trip path length would be limited to about 40 m (or 135 ft.) in room temperature air. FIG. 5 shows the transmitter pulse 11 under two vertical magnifications. It is clear that the transmitter is prone to a ringing which lasts about 1.5 msec. This means that no return signal should be received within this period (about 0.5 m round trip path length). This is not a significant limitation for the ATPMS in that a lead length of this magnitude is necessary to locate the TR/RE 2 away from the hot gas region in which the sensor tube is to be located.

Time of Flight Signals

Figure 6:
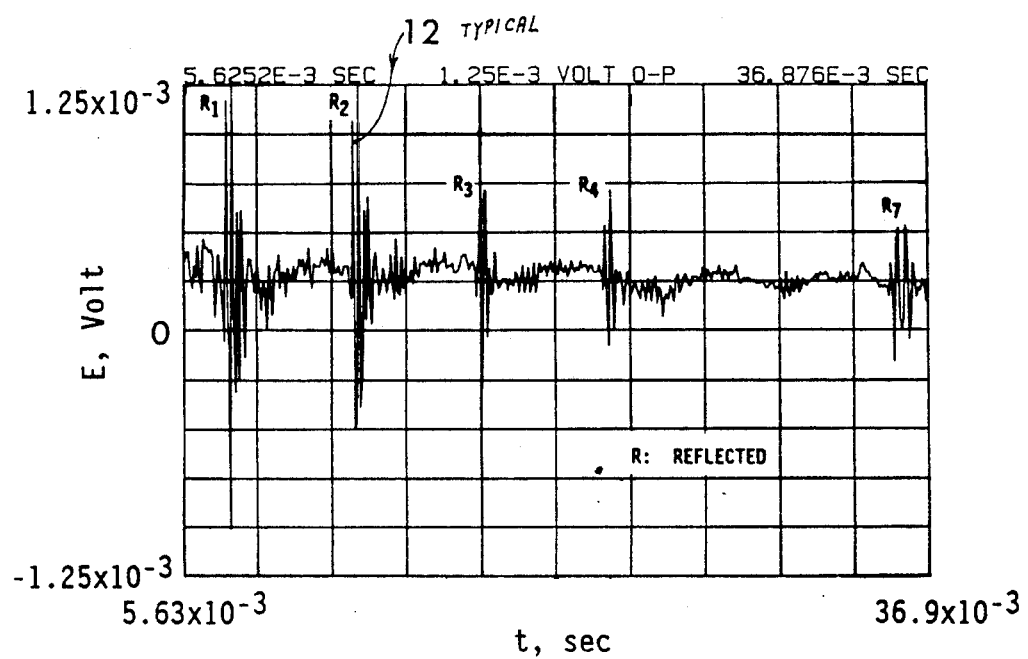
FIG. 6 is a record showing a train of reflected pulses.
Figure 7:
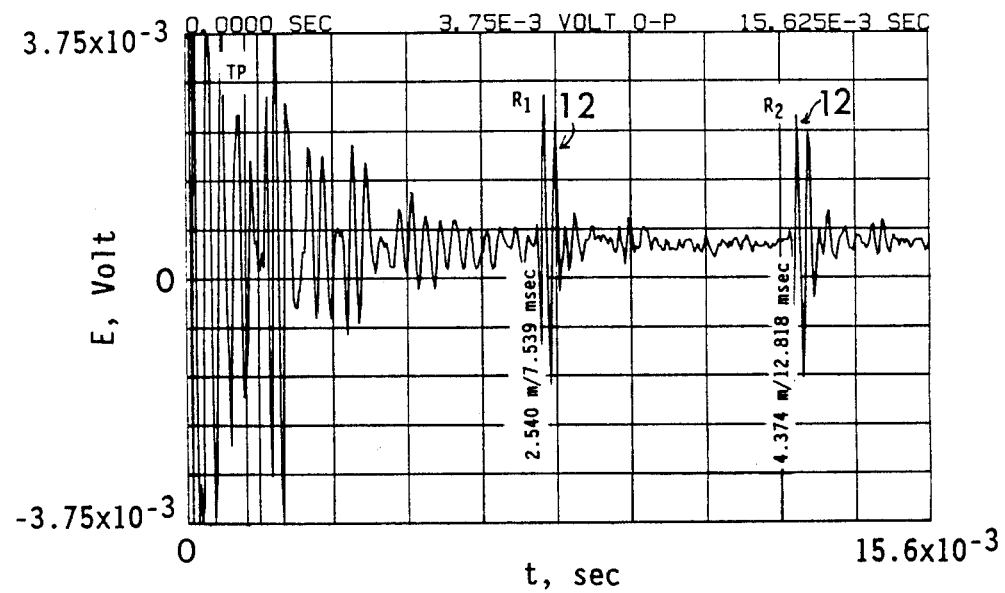
FIG. 7 is a record with an enlarged timescale showing the transmitted pulse together with the first two reflections.
Figure 8:
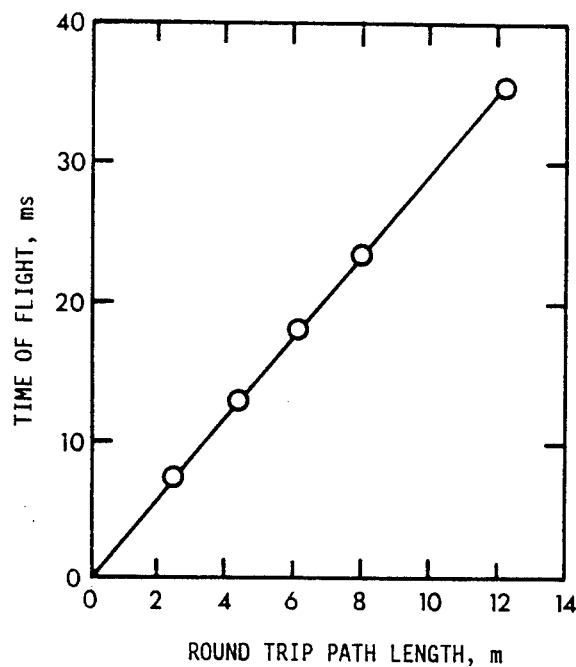
FIG. 8 is a graph of distance vs. time exhibiting excellent linearity corresponding to a constancy of temperature.

The first experiments for proof of concept purposes were done with a sensor which was comprised of short segments having a small axial mismatch in radius that provided the sound reflections. The sensor was placed on a long optical bench and was about 12 m long (round trip path of $\approx$ 24 m). For accurate time measurement, a Wavetek Spectrum Analyser, capable of time accuracy of a microsecond was used. The reflected pulses 12 are all shown in FIG. 6. A time expanded part of FIG. 6 is shown in FIG. 7. It is clear that the return pulses 12 have a sharp structure and hence are easily separated from the background. The corresponding TOF vs round trip path length plot of FIG. 8 shows excellent linearity at a measured temperature of 25.5.° C.

Heat Transfer Considerations and Options

Having thus ascertained that the method is viable for measurements over relatively large path lengths, we directed our attention to some heat transfer aspects that have a bearing on the design of ATPMS. The basic requirement of the ATPMS is that the sensor be in equilibrium with the surrounding gas and preserve the axial variation that would have existed were the sensor absent. This requires the following conditions to be satisfied:

(i) Heat transfer to the hot gas in the sensor be radial.
(ii) Axial conduction in the sensor tube wall be small.
(iii) Convection and axial diffusion in the gas in the sensor tube be small. These criteria require the following:
(i) Heat transfer from the surrounding hot gases to the tube 1 be relatively large.
(ii) Sensor tube wall be relatively thin (commensurate with structural requirements) and have as low a thermal conductivity as possible.
(iii) Diameter of sensor be as small as possible so that large scale convective motions do not occur.

In light of these requirements, various sensor concepts utilizing heat transfer enhancement schemes were considered. With the obvious advantages in using a chosen gas as against the combustion gases of variable/unknown composition (Note that $\gamma$ will be known accurately for a chosen gas) we chose the so called non contact option for further study. Even though some type of heat transfer augmentation can be employed, it was found that the plain tube version was adequate. If it is desired to reduce gas convection and diffusion effects within the sensor one could use the chosen gas under reduced pressure. Though this would require longer equilibration time and also increase the time constant of the system, it may not be a disadvantage for an industrial application.

Sensor Thermal Test System

With the requirements of both heat transfer and ruggedness the sensor material was chosen to be stainless steel for the current tests.

SS 310 has the following relevant properties:
Max. Temp. without excessive scaling = 2000° F. (1100° C.)
Melting Range = 2550°–2650° F. (1400°–1450° C.)
Thermal Conductivity is 7.5 Btu/ft.hr.°F. (13 W/m°K.) at 212° F. (100° C.) and 10 Btu/ft.hr°F. (17.3 W/m°K.) at 932° F. (500° C.).

Figure 9:
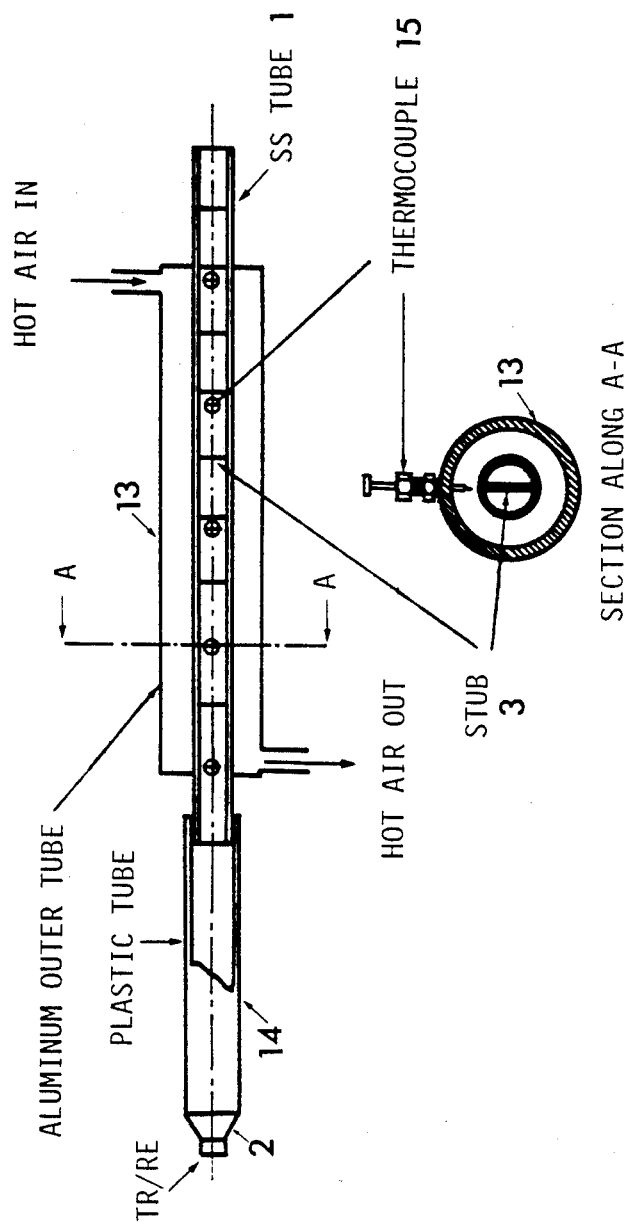
FIG. 9 is a sketch of the apparatus used to test how well the temperature profile in a flowing hot gas is transferred to the gas inside the stainless steel sensor tube.

For the low temperature tests the set up is shown schematically in FIG. 9. For the high temperature tests the outer aluminum tube 13 was replaced by a tubular furnace. The plastic lead tube was approximately a meter long and the 1 in. OD stainless steel sensor tube 14 was approximately 3 m long. Brass rods 3 of 6 mm diameter were welded in place diametrically at approximately 25 cm intervals to provide the sound reflection sites. The outer aluminum tube 13 was approximately 2.25 m. long. A hot air blower with 1250 W rating was used for heating and 5 chromel-alumel thermocouples 15 immersed to a depth of 10 mm in the hot air flowing in the sensor-outer tube annulus were used to measure the air temperature.

LOW TEMPERATURE TESTS

The low temperature tests were conducted both in the horizontal and the vertical sensor configurations. In the latter case the hot end was below and thus free convection effects, if any, would be the largest. Since length measurement using a tape measure was not accurate enough we always used a calibration TOF experiment with the sensor at room temperature (measured to 0.1° C. resolution). From this data all the sensor section l's could be obtained to an accuracy of 0.1 mm. The hot experiment followed the calibration run and used the calibrated l's to determine the temperatures.

Figure 1:
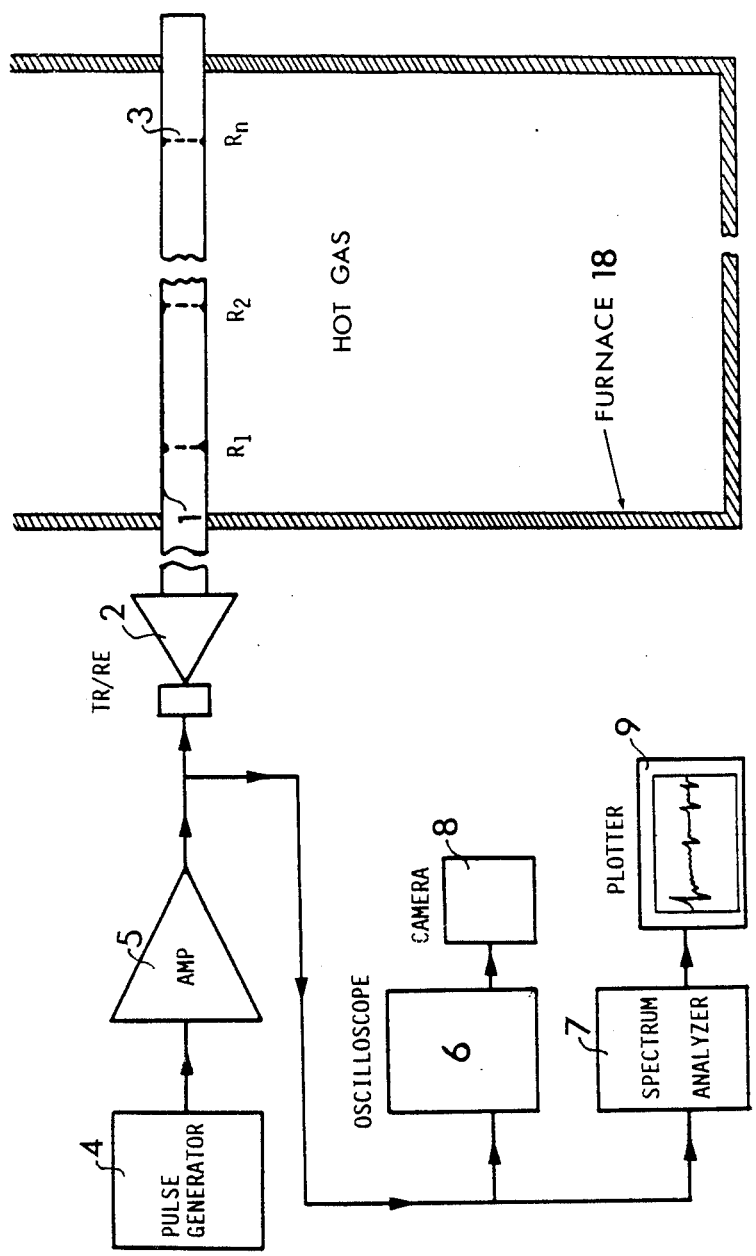
FIG. 1 is a schematic of the acoustic temperature profile measuring system (ATPMS) showing a sensor tube with reflecting stubs being probed acoustically from one end.
Figure 2:
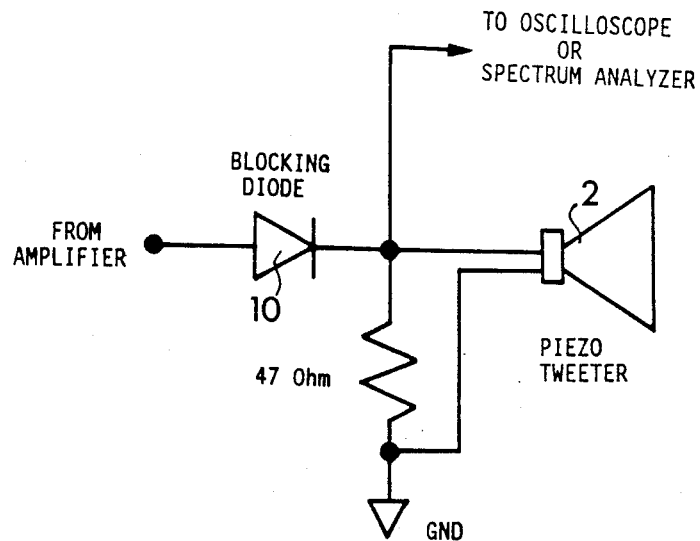
FIG. 2 is a sketch showing the use of an isolation diode which also prevents oscillations in the output amplifier.
Figure 3:
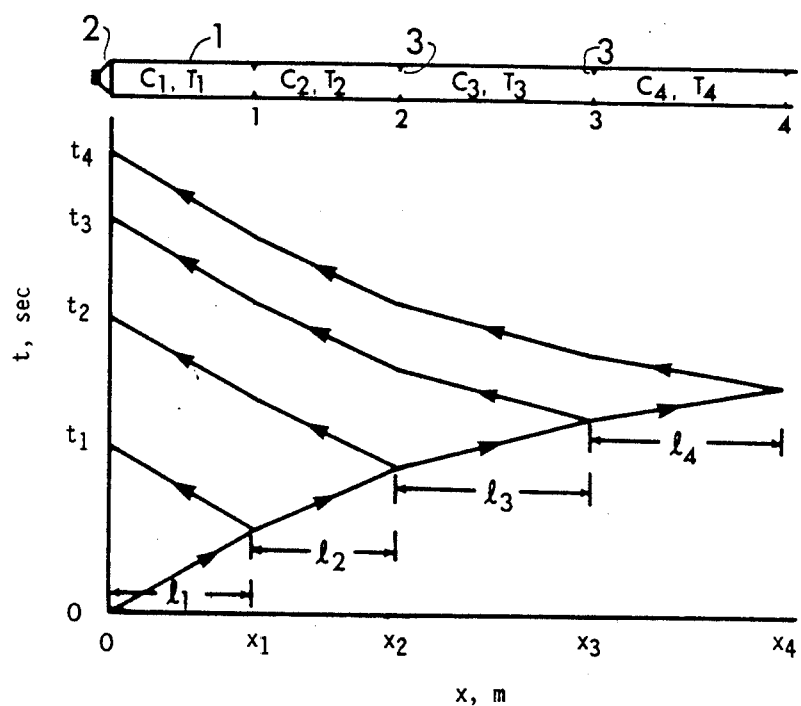
FIG. 3 is a space-time diagram where the tracks of a pulse wavefront and its several reflections at the stubs are shown.
Figure 10:
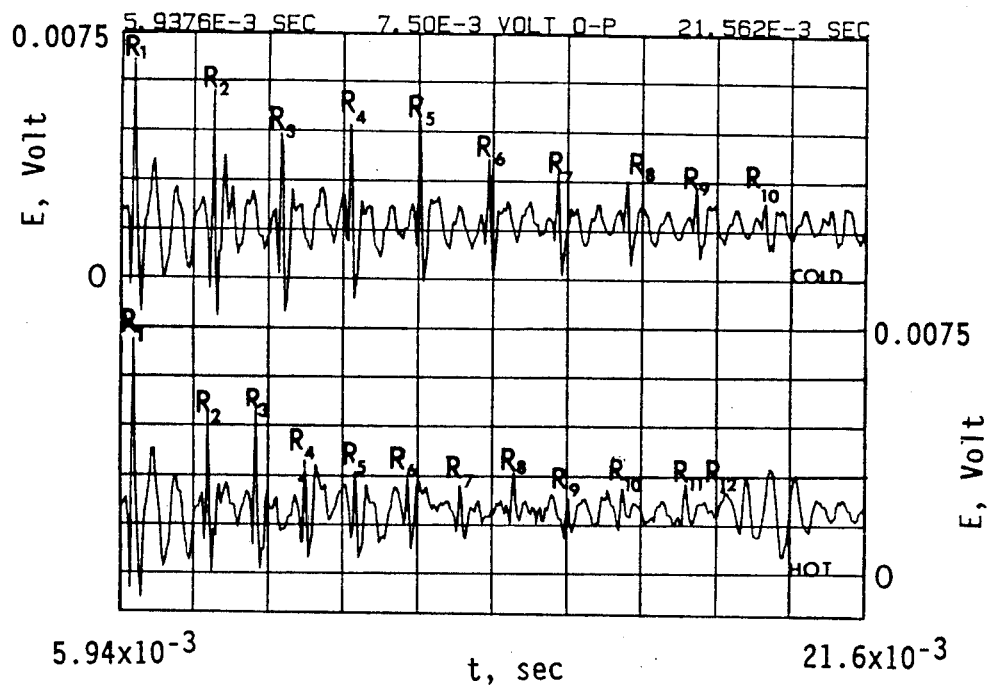
FIG. 10 is a record of reflections from the stubs in the cold condition which is compared to the hot case where decreases of time intervals are apparent.
Figure 11:
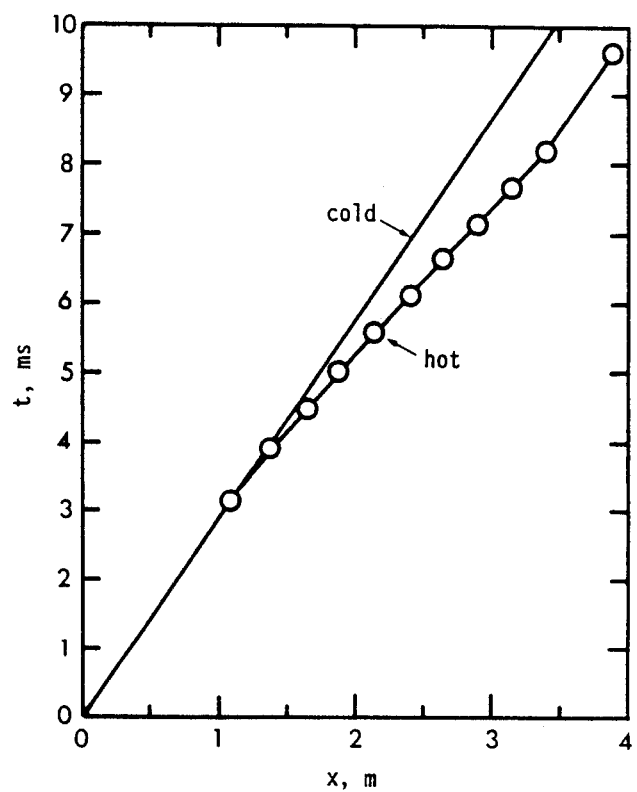
FIG. 11 is a space-time plot of the data obtained from FIG. 10.
Figure 12:
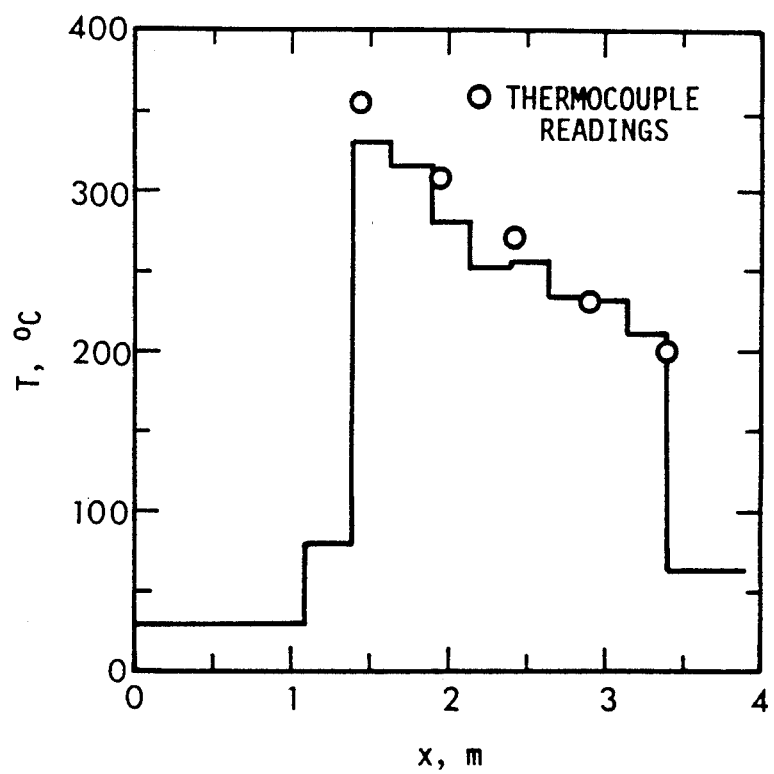
FIG. 12 is a graph of the calculated temperature profile compared with thermocouple readings outside the sensor tube in moving hot air, the time interval data being obtained from FIGS. 10 and 11.

In FIG. 10 we show both the calibration (cold) and the test (hot) signals for the vertical sensor case. The time "compression" of the signals in the hot case is clearly evident. By expanding the time axis, the times can be measured with microsecond resolution. An x-t diagram (FIG. 11) showns the cold and hot data (compare with the idealized diagram FIG. 3). A temperature profile is shown in FIG. 12 for the vertical sensor configuration with the hotter end below. The excellent agreement between the TOF and the thermocouple values is to be noted. Small axial diffusion effects are present but do not penetrate more than about 0.25 m (which is much smaller than the 3–5 m averaging needed in lime kiln applications).

HIGH TEMPERATURE TESTS

Figure 13:
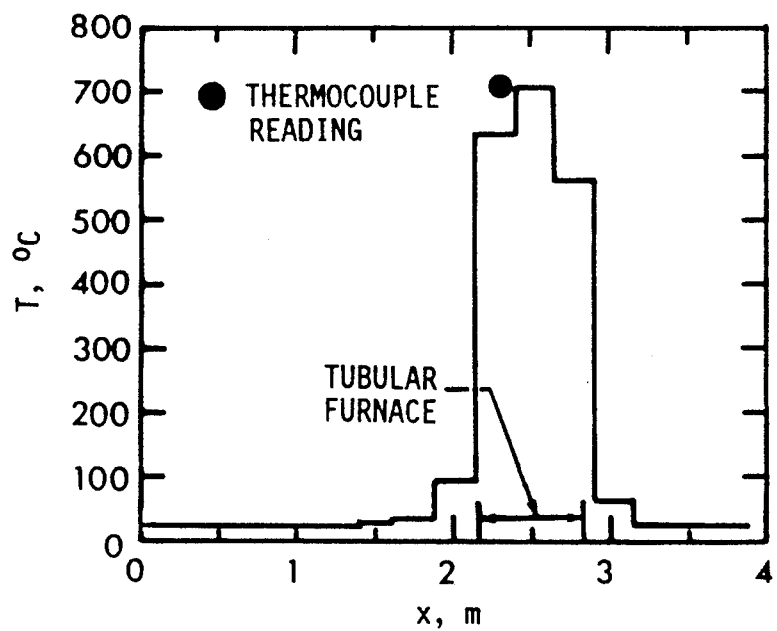
FIG. 13 is a plot of the temperature profile obtained using a tubular furnace which enables much higher temperatures to be attained, showing also a thermocouple reading for comparison.

The high temperature tests used a "Mellen" tubular furnace 16. The temperature profile shown in FIG. 13 again shows the capability of the ATPMS. The asymmetry in the profile is attributed to the fact that the tubular furnace ended in a region between two reflectors and hence the adjacent reflections straddled a hot region and a cold region. It is to be noted that the maximum temperature was around 710° C. and the "edges" between this and the adjacent low temperature region were sharply delineated.

Figure 14:
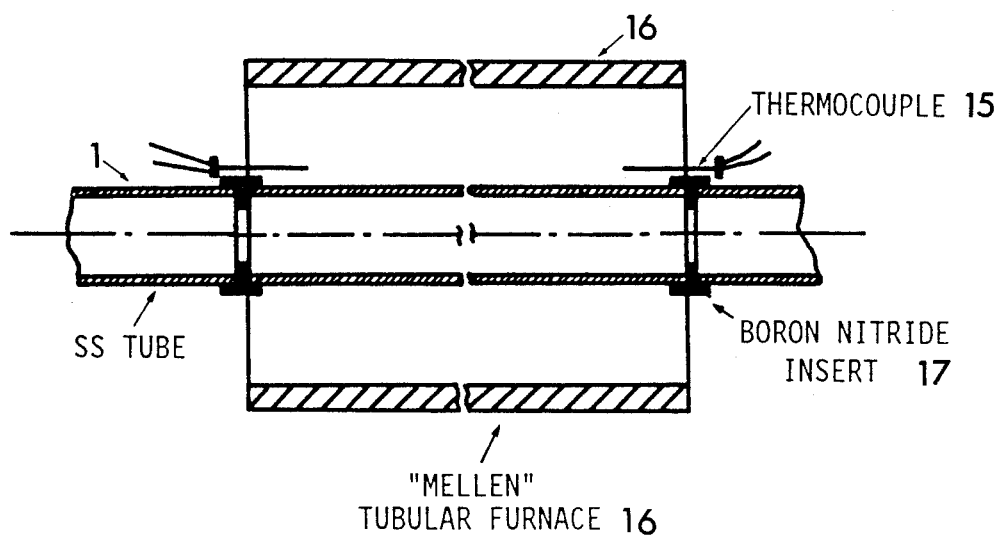
FIG. 14 is a drawing of a sensor tube with insulating boron nitride rings as the reflectors.
Figure 15:
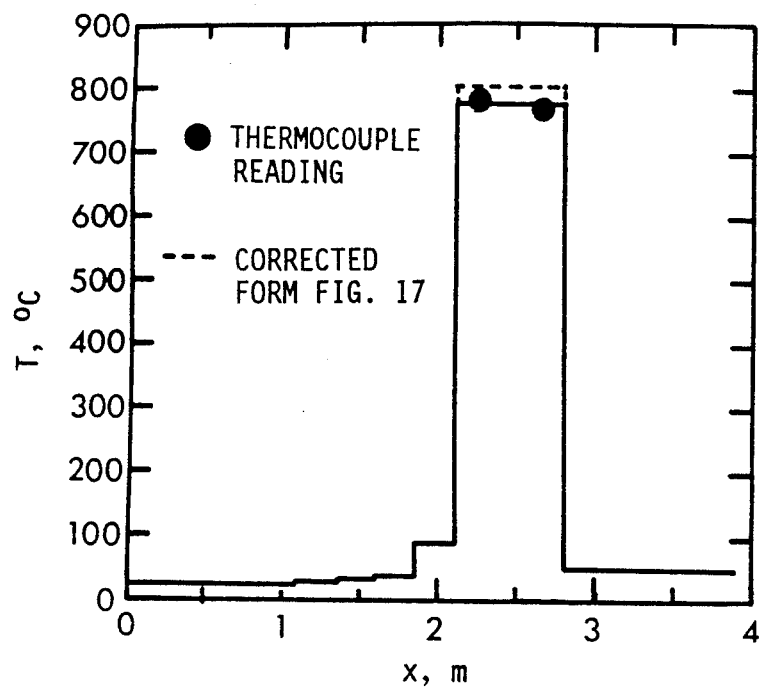
FIG. 15 is a plot of the acoustic temperature profile being compared with two thermocouple readings.

In order to reduce the diffusion effect in the sensor wall we have tried another variant where the heated region was separated from the rest of the sensor by insulating inserts 17 (machinable Boron Nitride) which also gave rise to the reflected signals (FIG. 14). The temperature profile in FIG. 15 is the result from this case.

The agreement with the two thermocouple readings and the excellent "edge" to the profile shows that inserts are an excellent idea.

Correction for Thermal Expansion

The quantity $l_n$ in Eq. (1) increases slightly with temperature because of thermal expansion. If the spacing at cold conditions is indicated by $l_c$ for which the time pulses are separated by interval $\Delta t_c$, we have $$c_c = 2l_c/\Delta t_c. \tag{4}$$

Similarly under hot conditions, $$c_h = 2l_h/\Delta t_h \tag{5}$$

Defining $c_h/c_c = (T_h/T_c)^{\frac{1}{2}} = \theta^{\frac{1}{2}}$, \hfill (6)

$$\tau = \Delta t_c/\Delta t_h, \tag{7}$$

and $$\begin{aligned} l_h/l_c &= 1 + \alpha(T_h - T_c) \\ &= 1 + \lambda(\theta - 1), \end{aligned} \tag{8}$$

where $\lambda = \alpha T_c$. \hfill (9)

we get from (4)–(8), $$\theta^{\frac{1}{2}} = (1 + \lambda(\theta - 1))\tau. \tag{10}$$

The uncorrected value of $\theta$, corresponding to $\lambda = 0$, is given by $$\theta_u^{\frac{1}{2}} = \tau. \tag{11}$$

The correction to $\theta$ is therefore given by $$\theta_{cor} = \theta - \theta_u \tag{12}$$

Figure 16:
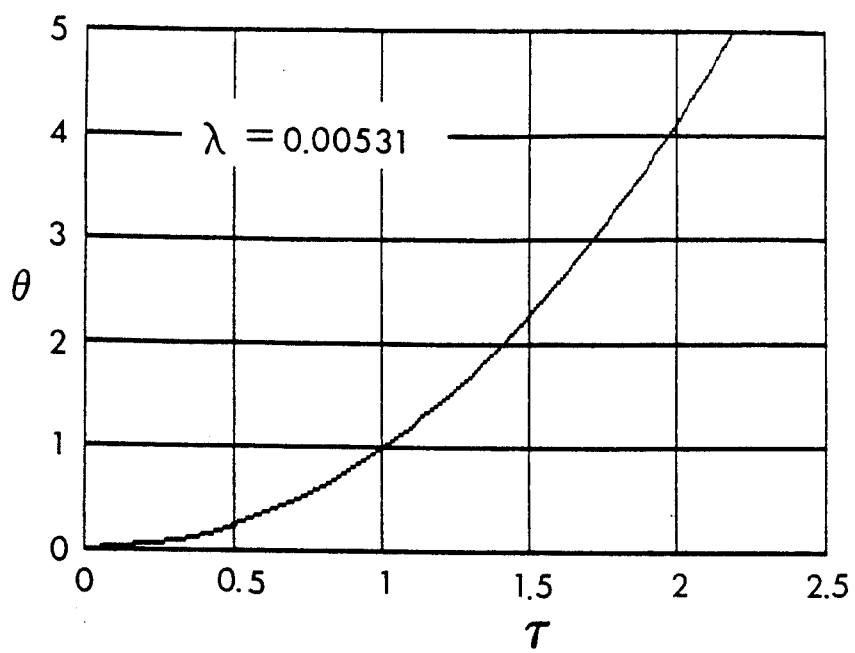
FIG. 16 is a plot of the speed of sound ratio $\theta$ vs. time ratio $\tau$ using the coefficient of expansion appropriate to stainless steel.
Figure 17:
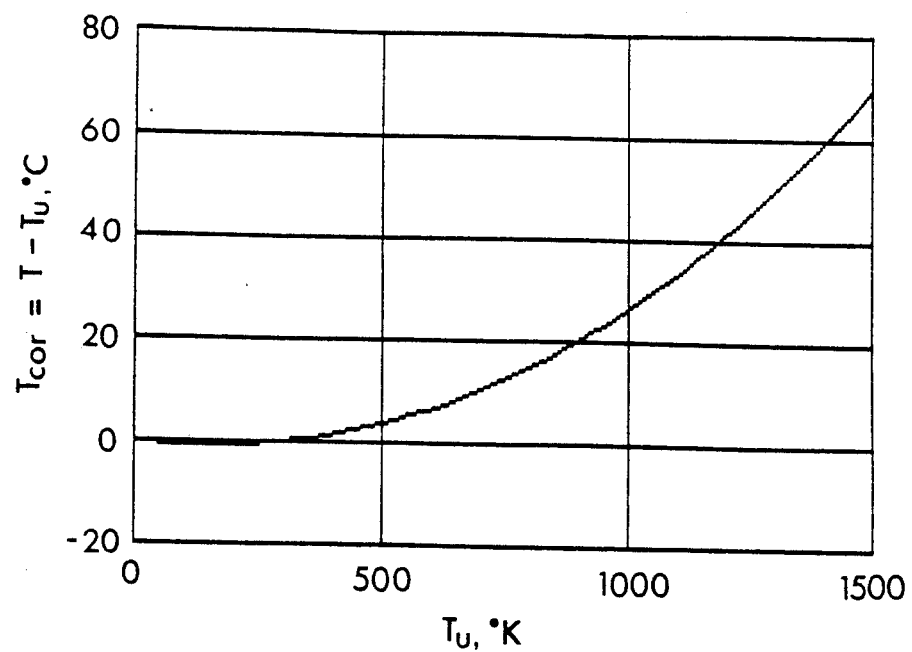
FIG. 17 is a plot of the temperature correction to be added to the uncorrected temperature to account for thermal expansion.

A plot of $\theta$ vs $\tau$ is shown in FIG. 16. The curve differs slightly from the parabola defined in Eq. (11). The correction to the temperature to be added to $\tau^2$ to get the true temperature is shown in FIG. 17. A correction based on this analysis was made for the high temperature test shown in FIG. 15 and the result is included therein.

Time Constant of the Sensor

Figure 18:
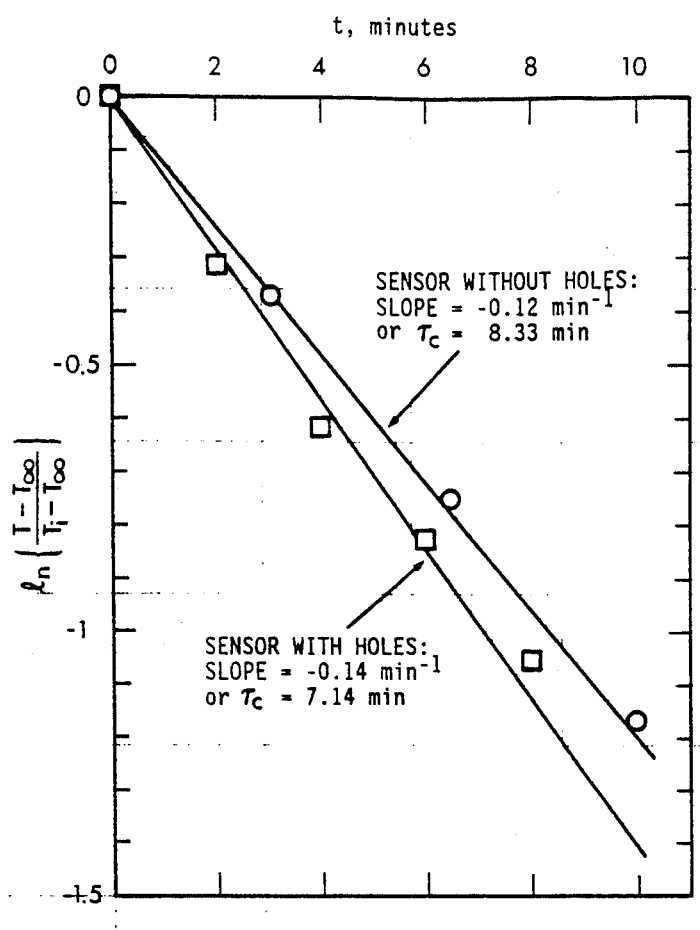
FIG. 18 is a graph of the logarithmic decrement vs. time in minutes of a tubular sensor with and without breathing holes.

The stainless steel tube 1 with reflecting stubs 3 was heated to an initial high temperature $T_i$ by sliding a tubular furnace 16 over it and allowed to come to equilibrium. Then the furnace 15 was slid off exposing the tube 1 to the ambient. Acoustic temperatures were measured at intervals of one or two minutes. The quantity $l_n\{(T-T_\infty)/(T_i-T_\infty)\}$ was calculated from the measurements by ATPMS and plotted vs time to obtain the rate of change. Experimental data obtained for 10 minutes is shown in FIG. 18. The ordinate falls to $-1$ in 8.33 min for the stainless steel sensor tube. For comparison, tests on the same tube with breathing holes (21 holes each of 1/16 inch diameter) show a smaller time constant equal to 7.14 min. In still air, the presence of holes does not make much difference in the time constant. However, in a situation where hot gases are moving with significant velocities, the time constant would be less because of forced convection with or without holes in the tube. Note that a time constant of the order of 10 min is probably adequate for the control of industrial kilns and furnaces.

REFERENCES

Gopalsami, N. and Raptis, A. C., 1984, "Acoustic Velocity and Attenuation Measurements in Thin Rods with Applications to Temperature Profiling in Coal Gasification Systems, IEEE Trans. on Sonics and Ultrasonics, Vol. SU-31, No. 1, pp. 32–39.

Green, S. F., 1986, "Acoustic Temperature and Velocity Measurements in Combusion Gases," Proc. Eighth Heat Transfer Conf. (San Francisco, U.S.A.), Vol. 2., pp. 555–560.

Hedrich, A. L., Pardue, D. R., 1955, Sound Velocity as a Measurement of Gas Temperature, Chapter 21 in Temperature its Measurement and Control in Science and Industry (edited by H. C. Wolfe), Vol. 2, Reinhold Publishing Corporation, N.Y., pp. 383–392.

Lynnworth, L. C. and Patch, D. R., 1970, "New Sensors for Ultrasound: Measuring Temperature Profiles," Materials Research and Standards, Vol. 10, pp. 6–11.

Mayer, A. M., 1873, "On an Acoustic Pyrometer," Philsosphical Magazine, Vol. 45, p. 18.

O'Fallon, N. M., 1984, "Instrumentation and Monitoring," Chapter 12 in the Science and Technology of Coal and Coal Utilization (edited by B. R. Cooper and W. A. Ellingson, Plenum press, New York, pp. 633–634.

Plumb, H. and Cataland, G., 1966, "Acoustical Thermometer and the National Bureau of Standards Provisional Temperature Scale 2-20 (1965), "Int. J. Scientific Metrology, Vol. 2, No. 4, pp. 127–139.

Wadley, H. N. G. et al., 1986, "Ultrasonic Measurements of Internal Temperature Distribution, Phyl. Trans. R. Soc. London, Vol. A320, pp. 341–361.

The embodiments of the invention in which an exclusive property or privilage is claimed are defined as follows:

1. A system and method for deriving data indicative of temperature variations in hot fluids in large chambers, kilns, process vessels and the like comprising a long, resistant, heat conducting sensor tube containing a chosen gas which serves to transfer the temperature profile in the hot fluid just outside said tube to said gas inside said sensor tube; said tube containing a chosen number of stubs or other reflecting means inside said sensor tube which serve to partially reflect sound pulses that are used to probe said temperature profile that has been transferred into said sensor tube; a transmitting and receiving means for generating and detecting said sound pulses and their multiple reflections which propagate inside said sensor tube; a means for measuring the time intervals between said various pulses in the train of said multiple reflections from said reflecting means inside said sensor tube; and output means for calculating, tabulating, and displaying said temperature profile and generating useful control signals to utilize said calculated temperature profile in said combustion chamber, kiln, or process vessel.

2. A method as described in claim 1 wherein said sensor tube is of such thermal conductivity and thickness that the internal temperature profile is very close to said temperature profile just outside said tube.

3. A method as described in claim 1 wherein said sensor tube is of the order of 20 meters in length, is either open to outside gases or is closed and contains said chosen gas, in most cases air.

4. A method as described in claim 1 wherein the diameter of said sensor tube ranges from a few millimeters to 50 mm.

5. A method as described in claim 1 where said tube is of a material resistant to high temperature and is coated with suitable ceramics or refractory cements, if said temperatures expected to be measured are high enough to require such treatment; otherwise said sensor tube is left uncoated.

6. A method as described in claim 1 where said sensor tube contains a number of stubs or discontinuities on the order of 10 to reflect said sound pulses that are used to probe said temperature profile inside said sensor tube.

7. A method as described in claim 1 where the duration of said pulses is adjusted such that a typical wavelength in said sound pulse is greater than the diameter of said sensor tube such that only plane waves propagate. Typically, a pulse width of 0.1 milliseconds corresponding to a bandwidth of 10 kHz has a typical wavelength equal to 3.5 cm at ambient temperature in air and would be suitable for a sensor tube of diameter equal to 1.25 cm.

8. A method as described in claim 5 where the distance between said stubs can be chosen between 30 cm to 200 cm depending on the extent of said temperature profile desired.

9. A method as described in claim 1 where a single ended transmitter-receiver means is used to probe said temperature distribution in said sensor tube with an isolating diode across the terminals of said transmitter-receiver to prevent reflected signals from being short-circuited by said pulse generator or its output-amplifier, said diode also helping in the suppression of unwanted oscillations of said pulse generator or its output-amplifier.

10. A method as described in claim 1 where said pulses are repeated at a rate smaller than the round trip travel time from said transmitter-reciever means to the end of said sensor tube and back, typically a few times per second for long tubes.

11. A system for processing signals and deriving temperature distribution in large combustion chambers, the arrangement comprising:
a corrosion and high temperature resistant sensor tube suitable for the temperature range of interest containing a number of reflecting means at chosen locations inside said sensor tube; a transmitting-receiving means mounted at the cold end of said sensor tube; a pulse generating means to drive said transmitting-receiving means in a controlled manner; an amplifying means to detect multiple pulses of sound reflected by said reflecting means; a diode to isolate reflected signals produced in said receiving means by said reflected sound pulses from short circuiting by said pulse generator or its output-amplifier and also prevent unwanted oscillations from said output amplifier; means for detecting various time differences between said multiple pulses produced by said number of reflecting means in said sensor tube; output means for calculating and displaying said temperature profile from said measured time intervals.

* * * * *